United States Patent

Ausen et al.

[11] Patent Number: 6,146,756
[45] Date of Patent: Nov. 14, 2000

[54] HOT-MELT PROCESSABLE RELEASE MATERIAL, METHOD OF PREPARATION, AND ARTICLES THEREFROM

[75] Inventors: Ronald W. Ausen, St. Paul; Kevin T. Grove, Woodbury; Charles M. Leir, Falcon Heights; Audrey A. Sherman, St. Paul, all of Minn.; Walter R. Romanko, Austin, Tex.

[73] Assignee: 3M Innovative Properties Company, St. Paul, Minn.

[21] Appl. No.: 09/116,675

[22] Filed: Jul. 16, 1998

[51] Int. Cl.[7] .................................. C09J 7/02; B32B 7/12
[52] U.S. Cl. .......................... 428/352; 428/41.8; 525/102
[58] Field of Search .................................. 428/352, 40.1, 428/41.8; 525/102

[56] References Cited

U.S. PATENT DOCUMENTS

| | | |
|---|---|---|
| 2,532,011 | 11/1950 | Dahlquist et al. . |
| 4,379,806 | 4/1983 | Korpman . |
| 4,626,460 | 12/1986 | Duncan . |
| 4,933,124 | 6/1990 | Duncan . |
| 5,106,383 | 4/1992 | Mulder et al. ............................ 604/389 |
| 5,145,718 | 9/1992 | Pedginski et al. . |
| 5,314,959 | 5/1994 | Rolando et al. . |
| 5,336,717 | 8/1994 | Rolando et al. . |
| 5,525,375 | 6/1996 | Wang et al. ............................. 427/391 |
| 5,641,835 | 6/1997 | Smith et al. . |
| 5,700,571 | 12/1997 | Logue et al. . |

FOREIGN PATENT DOCUMENTS

| | | |
|---|---|---|
| 0 484-093-B1 | 5/1992 | European Pat. Off. . |
| 0-484-093 A2 | 5/1992 | European Pat. Off. . |
| 55-142096 | 11/1980 | Japan . |
| 09194806 A2 | 7/1997 | Japan . |
| 9-188858 | 7/1997 | Japan . |
| WO94/16885 | 8/1994 | WIPO . |
| WO95/33013 | 12/1995 | WIPO . |

OTHER PUBLICATIONS

Database WPI Derwent Publications Ltd., London, GB; AN 1986–222045, XP002116710 & JP 61 152785 A (Nitto Electric Ind Co Ltd), Jul. 11, 1986 abstract.

J. H. Saunders, et al., *Polyurethanes Chemistry & Technology*, Part 1: Chemistry, pp. 167–169 (1962).

"Release Compound," *Research Disclosure*, 37932, Nov. 1995.

*Primary Examiner*—Daniel Zirker
*Attorney, Agent, or Firm*—Lisa M. McGeehan

[57] ABSTRACT

An essentially solventless process for preparing a hot melt-processable release material comprises the step of providing reactants to a reactor, wherein the reactants comprise at least one backbone polymer having a grafting site that is reactive with a release component to selectively form a release moiety substituent at the grafting site; and a release component that is reactive with the grafting site. The release component is used in an effective amount for imparting release properties to the resulting release material. Also disclosed are release materials preparable thereby and coated substrates comprising the release material. Advantageously, release materials of the present invention are preparable and coatable using a single extruder.

19 Claims, No Drawings

HOT-MELT PROCESSABLE RELEASE MATERIAL, METHOD OF PREPARATION, AND ARTICLES THEREFROM

FIELD OF THE INVENTION

The present invention relates to release materials, methods of their preparation, and articles having coatings of the release material applied thereto.

BACKGROUND OF THE INVENTION

Articles that have release characteristics are used in a variety of applications. Adhesive-coated articles (e.g., with a pressure-sensitive-adhesive), such as tapes, die-cuts, labels, and the like, often employ a release coating as a part of their structure. The purpose of the release coating is to provide a surface to which the adhesive coating does not permanently adhere. For tapes in roll form, the coating is oftentimes referred to as a low-adhesion backsize (LAB). In this form, the adhesive surface contacts the back surface of the article. The LAB prevents the adhesive from permanently adhering to the back surface of the article and allows that article to be unwound.

In the past, release coatings have been applied to surfaces by preparing the release components in solvent, coating the solution onto a desired surface, and drying to evaporate the solvent. One example of a release coating formed using a conventional solvent-based process is found in U.S. Pat. No. 2,532,011 (Dahlquist et al.). Dahlquist et al. teach low-adhesion coatings of polyvinyl carbamate polymers, wherein the side chains terminate with a long chain alkyl group (i.e., an alkyl group more than five carbon atoms in length). An example is polyvinyl N-octadecyl carbamate, made by reacting together polyvinyl alcohol and octadecyl isocyanate. Dahlquist et al. teach that the polyvinyl carbamates therein are soluble in volatile aromatic solvents and may readily be applied in solution form by simple coating procedures followed by drying to form solvent-free, continuous films.

Solvent-based processes, however, have become increasingly less desirable due to special handling concerns associated therewith. This has led to accelerated interest in the use of hot-melt extrusion coating of release materials, backings, adhesives and the like. For example, U.S. Pat. No. 4,379,806 (Korpman) discloses preparation of pressure-sensitive-adhesive tapes by a single-step process of co-extruding a backing film-forming composition and an adhesive composition. A solventless release agent may be incorporated into either the adhesive or backing, rendering unnecessary the coating of the backside of the tape with a release agent. Korpman states that suitable release agents for incorporation into backing films include synthetic and natural waxes and copolymers of stearyl methacrylate and acrylonitrile.

U.S. Pat. No. 4,626,460 (Duncan) describes a biaxially oriented label stock product having a facing layer and a release layer. The facing layer is co-extruded with the release layer. The facing layer has a pressure-sensitive-adhesive material incorporated therein. The release layer is a polyolefin film having a release agent component. Suitable release agents described therein are silicones, modified silicones, polyethylene, fluorocarbon, Werner-type chromium complexes and polyvinyl octadecyl carbamate.

U.S. Pat. No. 5,700,571 (Logue et al.) describes a release liner consisting of a first olefin polymer film formed having dispersed therein by high shear mixing a release substance (polyethyleneimine octadecyl carbamide, polyvinyl octadecyl carbamate, or a mixture thereof) that is co-extruded or co-cast onto a film formed from a second olefin polymer (i.e., polypropylene-based). The release additive material is dry blended into the first olefin polymer film by melt blending using a SIGMA blade, BANBURY mixer or the like. It is stated that good blending cannot be achieved in a single-screw extruder with any expectation of forming a coherent film due to the tendency of the release additive to remain as a discrete particulate solid. In other words, the required conditions of high shear cannot be achieved in a single-screw extruder. Thus, after dry blending, the product is transferred to a single-screw extruder, where it can then be co-extruded with a polypropylene polymer film or recovered as pellets and subsequently added to an extruder.

European Pate Application No. 0-484-093-A2 (Neste Oy) discloses a polymer composition for forming release films. The film is formed of a reactive polyolefin that contains functional groups and a reactive silicone or other reactive release substance. The ingredients are caused to react by compounding them together in a molten state. The reactive compounding can be performed in connection with the film preparation to form a release film. The film can be prepared by means of a blown-film, cast-film, or extrusion coating technique. A reactive polyolefin mentioned therein is an ethylene/hydroxyethyl methacrylate copolymer having 8 mole % hydroxyethyl methacrylate, commercially available from Neste Oy under the tradename NCPE0465.Release substances exemplified therein are silicone-containing substances, an epoxidized soybean oil, and an alkyl cetene dimer. It is stated that the quantity of the reactive release substance can vary within the range of 0.1–20% by weight, although a suitable quantity is purportedly selected within the range of 1–10% by weight. It is cautioned that when higher contents of the release substance are used, the reaction compound can become too cross-linked.

Conventional release materials, release-coated films and articles have not proven to be entirely satisfactory for certain applications. Obtaining an optimum balance between release performance, cost-effectiveness, solvent-reduction, and processing efficiency is desired.

SUMMARY OF THE INVENTION

In one embodiment, the present invention comprises an essentially solventless process for preparing a hot melt-processable release material comprising the steps of:

providing reactants to a reactor, wherein the reactants comprise:
  at least one backbone polymer having a grafting site that is reactive with a release component to selectively form a release moiety substituent at the grafting site; and
  greater than about 20 weight %, based on total weight of the reactants, of a release component that is reactive with the grafting site;

mixing the reactants in the reactor;

allowing the reactants to react as described to form the release material; and removing the release material from the reactor. In another embodiment, the present invention comprises an essentially solventless process for preparing a hot melt-processable release material comprising the steps of:

providing reactants to a reactor, wherein the reactants comprise:
  at least one backbone polymer having a grafting site that is reactive with a release component to selectively form a release moiety substituent at the grafting site; and a monofunctional release component that is reactive with the grafting site;

mixing the reactants in the reactor;

allowing the reactants to react as described to form the release material; and removing the release material from the reactor.

Preferably, the backbone polymer is an olefin-derived backbone polymer, such as, for example, a polymer derived from monomers selected from the group consisting of vinyl esters (e.g., vinyl acetate) and alpha-olefins (e.g., propylene and ethylene). For example, the olefin-derived backbone polymer may comprise ethylene-containing units, wherein at least one ethylene-containing unit has at least one grafting site (e.g., a pendant hydroxyl group) attached thereto.

The release component is used in an effective amount for imparting release properties to the resulting release material. It is well understood, however, that release properties will vary depending on the particular application in which the release material is to be used. Preferably, the release component is reacted in an amount of at least about 20 weight %, more preferably at least about 25 weight %, based on total weight of the reactants. An example of a suitable release component is a monofunctional hydrocarbon isocyanate. The release component reacts with the grafting site to form a release moiety substituent. Typically, the release moiety substituent is urethane-linked to the backbone polymer.

It should also be noted that the reactants may further comprise a catalyst. Also, additives may be added to the reactor during the process.

To optimize efficiency, the process of the present invention is preferably a continuous process. The process may further comprise the step of drying at least one of the reactants and/or the step of purifying at least one of the reactants prior to adding the reactant to the reactor.

Furthermore, the process of the present invention may comprise the step of forming a film from the release material. In one embodiment, the process comprises the step of forming a layered film from the release material and at least one co-extruded material, such as a backing material, an adhesive material, a tie layer, or mixtures thereof. In such embodiments, the process may further comprise the step of orienting the film or layered film.

Advantageously, release materials of the present invention are preparable and coatable using a single extruder. For example, a release material comprising an olefin-derived backbone polymer comprising urethane-linked, long chain alkyl substituents is preparable and coatable using a single extruder.

However, the release material may alternatively be removed from the reactor and pelletized, for example, instead of coating it directly from the reactor, such as when using an extruder. Also, the release material may be prepared in a reactor, removed from the reactor, and then solvent-coated onto a substrate to form a film of the release material.

Also disclosed is hot-melt processable release material preparable according to the process of the present invention. In one embodiment, a hot-melt processable release material comprises a polymer prepared according to the process of the invention. Most, preferably, the release material consists essentially of the polymer. Preferably, the polymer comprises polymeric units represented by those in the following formula:

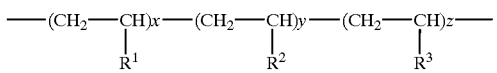

wherein:

$R^1$ is independently selected from the group consisting of H and an aliphatic group (for example, an alkyl group);

$R^2$ is independently selected from the group consisting of a functional group and an organic group having a terminal functional group;

$R^3$ is independently an organic group having a urethane linkage to the backbone polymer and a terminal alkyl group (preferably comprising at least about 16 carbon atoms, such as about 16 carbon atoms to about 20 carbon atoms); and x, y, and z represent mole fractions of the individual polymeric units.

Release materials of the present invention may be coated on a wide variety of substrates. For example, a substrate can be at least partially coated with the hot-melt processable release material of the present invention. Articles comprising the release material may also be formed. One such article comprises a backing having a first side and second side; and the hot-melt processable release material coated on at least a portion of the first side of the backing and, optionally, on at least a portion of the second side of the backing. When the article is a tape, it further comprises an adhesive coated on at least a portion of the backing.

DETAILED DESCRIPTION OF THE PREFERRED EMBODIMENTS

The following description will make reference to terms that are described below for convenience of the reader.

As used herein, "release material" refers to a composition that is capable of being formed into a release coating.

"Release coating" refers to a component, preferably a film, that exhibits low adhesion to an adhesive, such as a pressure-sensitive-adhesive (PSA), so that separation can occur substantially between the adhesive and release coating interface. In tape applications, a release coating is often referred to as a "low adhesion backsize," or LAB. LABs typically have a release force value of less than about 50 N/dm and can be used in adhesive tape rolls, where the tape is wound upon itself and usage requires unwinding of the tape roll. Release coatings can also be used as a "liner" for other adhesive articles, such as labels or medical dressing bandages, where the adhesive article is generally supplied as a sheet-like construction, as opposed a roll-like construction. Release coatings used for liner applications typically possess a release force value of less than about 5 N/dm.

Release materials of the present invention are synthesized using a process where solvent usage is reduced. In fact, the process is essentially free of solvents (i.e., the process utilizes no more than about 5 weight % solvents, more typically, no more than about 3 weight % solvents, and most typically no solvents, based on total weight of the reactants). Furthermore, release materials of the present invention are hot-melt processable.

"Hot-melt processable" materials have a sufficient viscosity upon heating, such that they can be hot-melt processed (e.g., by pumps, extruders, and other conventional processing means). By adjusting the processing temperature, the viscosity of the material can be readily tailored for application.

"Hot-melt processable systems" are essentially 100% solid systems. Usually, such systems have no more than about 5 weight % organic solvents and/or water, more typically, no more than about 3 weight % organic solvents and/or water based on total weight of the system. Most typically, such systems are free of organic solvents and water. Advantageously, by reducing the use of organic solvents, special handling concerns associated therewith are also reduced.

Release materials and reactants from which they are derived are often characterized by their chemical constituents, as readily recognized by one of ordinary skill in the art. In the context of the present invention, the term "aliphatic group" means a saturated or unsaturated, linear or branched, hydrocarbon group. This term is used to encompass alkyl, alkenyl, and alkynyl groups, for example. The term "alkyl group" means a saturated, linear or branched, hydrocarbon group (e.g., a methyl, ethyl, isopropyl, t-butyl, heptyl, dodecyl, octadecyl, amyl, or 2-ethylhexyl group, and the like). The term "alkenyl group" means an unsaturated, linear or branched, hydrocarbon group with one or more carbon-carbon double bonds (e.g., a vinyl group). The term "alkynyl group" means an unsaturated, linear or branched, hydrocarbon group with one or more carbon-carbon triple bonds.

The term "cyclic group" means a closed ring hydrocarbon group that is classified as an alicyclic group, aromatic group, or heterocyclic group. The term "alicyclic group" means a cyclic hydrocarbon group having properties resembling those of aliphatic groups. The term "aromatic group" or "aryl group" means a mononuclear aromatic hydrocarbon group or polynuclear aromatic hydrocarbon group.

Such aliphatic groups, as used herein, may include heteroatoms (e.g., oxygen, nitrogen, and sulfur atoms, as in the case of heterocyclic groups), as well as functional groups (e.g., carbonyl groups, amino groups, alkoxy groups, and hydroxyl groups).

Release materials of the present invention are derivable by reacting associated reactants (preferably using solventless methods), such as by reactive extruding to form release moiety substituents grafted to a backbone polymer, preferably an olefin-derived backbone polymer.

"Olefin-derived backbone polymers" are those that are at least partly derived from ethylenically unsaturated monomers. Preferably, the ethylenically unsaturated monomers are selected from the group of vinyl esters (e.g., vinyl acetate) and alpha-olefins (e.g., propylene and ethylene).

"Release moiety substituents" are those substituents that are grafted to the backbone polymer and that are capable of imparting release properties to a material.

"Grafting sites" are functional groups on the backbone polymer that are reactive with a release component, such that the grafting site is modifiable with a release moiety substituent, grafted to the backbone polymer.

"Release components" are compounds that are reactive with the grafting sites to form release moiety substituents grafted to the backbone polymer.

A preferred embodiment of the present process and release materials prepared therefrom simply requires preparation of only one polymeric material unlike blends (i.e., a combination of two or more different polymers), such as those that are prepared by blending a prepared polymeric release material with a polymeric material that does not have release properties. Advantageously, a single polymeric material can be prepared and coated to form a release coating using a simple, efficient process and even using a single extrusion step. In contrast, blends typically require preparation of individual polymeric components, blending thereof, and then coating. Thus, due to processing efficiency, the present release materials preferably consist essentially of a single polymer (i.e., the release material has less than about 5 weight % other polymeric materials, more preferably, less than about 3 weight % other polymeric materials, based on the total weight of the release material). More preferably, the present release materials consist of a single polymer (i.e., the release material includes no other polymeric materials).

A further advantage of the present release materials over blends is that, to facilitate blending of more than one polymeric material, the use of solvents is often required. However, the present release materials can be prepared via a solventless process (i.e., without organic solvents or water).

Preferably, to obtain release materials of the present invention, an extruder is used for their preparation, although any suitable reactor can be used. The release materials can be extruded in a wide variety of forms. For example, the release material may be formed in strands that can be subsequently formed into pellet shapes for subsequent hot-melt application to a substrate. Alternatively, the release material may be extruded in the form of a release coating. In this embodiment, the release material may, optionally, be co-extruded with one or more materials. For example, the release material can be co-extruded with a backing material and, if desired, a tie layer and/or an adhesive material.

Release Material

The release material of the present invention comprises a polymer, preferably having an olefin-derived backbone, having at least two substituents (i.e., a first substituent comprising a grafting site and a second substituent, also referred to as a release moiety substituent) grafted thereto. The polymer comprises polymeric units generally represented by those in the following general Formula I:

$$—(A)_x—(B)_y—(C)_z— \quad (I)$$

Each of the polymeric units (A, B, and C) may be arranged in any order (not necessarily the order shown in Formula I), but preferably such that a random copolymer is formed.

Preferably, th polymeric units are those represented in general Formula II:

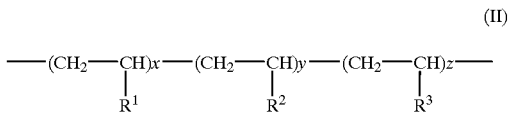

$$—(CH_2—CH)_x—(CH_2—CH)_y—(CH_2—CH)_z— \quad (II)$$
$$\quad\quad\quad |\quad\quad\quad\quad |\quad\quad\quad\quad |$$
$$\quad\quad\quad R^1\quad\quad\quad R^2\quad\quad\quad R^3$$

wherein:

$R^1$ is independently selected from H or an aliphatic group, such as an alkyl group (preferably H or a short chain alkyl group having about 1 carbon atom to about 4 carbon atoms);

$R^2$ is independently selected from a first substituent that is a functional group or an organic group having a terminal functional group (e.g., a hydroxyl group, a carbon-carbon double bond, a carbon-carbon triple bond, an amino group, a cyano group, a carboxyl group, an aldehyde group, an alkoxy group, or a halide group). Preferably, the organic group is an alkyl group, which may optionally contain heteroatoms. Most preferably, $R^2$ is a hydroxyl group or an organic group having a terminal hydroxyl group.

$R^3$ is independently selected from a second substituent that is an organic group having a urethane linkage to the olefin-derived backbone and terminated with an alkyl group (preferably, with a long chain alkyl group having at least about 16 carbon atoms, more preferably having about 16 carbon atoms to about 26 carbon atoms, even more preferably having about 16 carbon atoms to about 22 carbon atoms, and most preferably having about 16 carbon atoms to about 20 carbon atoms).

Accordingly, most preferably, the polymeric units in the release material are those represented in general Formula III:

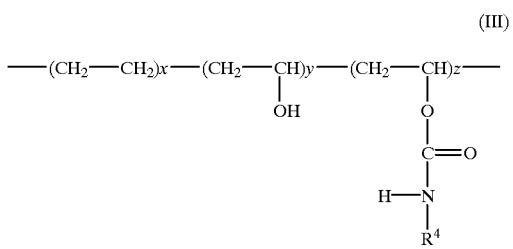

(III)

wherein $R^4$ is an alkyl group. Preferably, $R^4$ contains at least about 16 carbon atoms (i.e., $R^4$ is a long chain alkyl group), more preferably, $R^4$ contains about 16 carbon atoms to about 26 carbon atoms, even more preferably about 16 carbon atoms to about 22 carbon atoms, and most preferably about 16 carbon atoms to about 20 carbon atoms.

Subscripts x, y, and z in each of Formulas I-III represent the proportion (in terms of mole fraction of the total polymeric units) of each unit in the polymer and x+y+z=1. The value for subscript x depends on the olefin-derived backbone component of the reactants and is typically dictated by availability. Preferably, $0 \leq x \leq 0.80$; more preferably, $0.25 \leq x \leq 0.60$; and most preferably, $0.40 \leq x \leq 0.60$. Preferably, $0 \leq y \leq 0.97$; more preferably, $0 \leq y \leq 0.72$; and most preferably, $0 \leq y \leq 0.57$. Preferably, $0.03 \leq z \leq 1.00$; more preferably $0.03 \leq z \leq 0.75$; and most preferably, $0.03 \leq z \leq 0.60$.

As illustrated in Formula III, preferably, the polymer comprises a first substituent that is a hydroxyl group and a second substituent that is a urethane-linked alkyl group. As such, an isocyanate-containing hydrocarbon is preferably the release component that is reacted with the grafting site (i.e., the hydroxyl group) on the backbone polymer to form the preferred second substituent—the urethane-linked, long chain alkyl release moiety substituent. However, any suitable release component can be reacted with the first substituent to form the release moiety substituent in its place.

The backbone polymer having at least the first substituent attached thereto may be prepared from a wide variety of materials. The backbone polymer is preferably olefin-derived. In one such embodiment, preferably the backbone polymer consists essentially of ethylene-containing units, some of which have at least one pendant hydroxyl group attached thereto. For availability, it is preferred that the backbone polymer contains about 0.2 mole fraction to about 1.0 mole fraction, most preferably about 0.25 mole fraction to about 0.75 mole fraction, ethylene-containing units having pendant hydroxyl groups attached thereto. The backbone polymer can be either purchased or prepared from smaller units (i.e., precursors). For exam e, ethylene/vinyl alcohol copolymers are commercially available from EVAL Company of America under the trade designation, EVAL.

Any suitable precursors can be used to prepare the backbone polymer having at least the first substituent attached thereto, including, but not limited to, precursors from the group of alpha-olefins (e.g., ethylene and propylene), vinyl halides (e.g., vinylidene chloride), vinyl ethers (e.g., vinyl propyl ether), vinyl esters (e.g., vinyl acetate), acrylic esters (e.g., methyl acrylate), methacrylic esters (e.g., ethyl methacrylate), acids (e.g., acrylic acid and methacrylic acid), amides (e.g., acrylamide), aromatic vinyl compounds (e.g., styrene), heterocyclic vinyl monomers, allyl compounds, esters and half esters of diacids (e.g., diethyl maleate), and mixtures thereof. Of these, those that do not contain acrylate groups are preferred, most preferably, those that are alpha-olefins and vinyl esters are used.

Preferred backbone polymers having a first substituent attached thereto can be prepared by polymerizing and co-polymerizing vinyl esters to afford, for example, polyvinyl acetate and ethylene/vinyl acetate copolymer, either fully or partially hydrolyzed, to form polymers having vinyl alcohol units. Some commercially available materials may retain acetate groups. These materials are also referred to herein as vinyl-derived.

As mentioned above, a preferred embodiment of the invention comprises a release material comprising a polymer formed from modification of an olefin-derived, preferably a vinyl-derived, backbone, as described above, with a release component, preferably certain hydrocarbon isocyanates. For example, reaction of a polyvinyl alcohol with a hydrocarbon isocyanate results in the modification of hydroxyl groups on the backbone to form urethane-linked (i.e., carbamate-linked groups) alkyl groups.

The hydrocarbon isocyanates comprise linear, branched, cyclic, or aromatic (e.g., phenyl isocyanates) hydrocarbon groups. Preferably, however, linear hydrocarbon isocyanates are utilized such that the urethane groups link long side-chain hydrocarbons that terminate with methyl groups.

Typically, hydrocarbon isocyanates have the general Formula (IV):

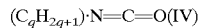

$(C_qH_{2q+1})\cdot N=C=O$ (IV)

where q preferably has a value of at least 16, more preferably, at least about 16 to about 26, even more preferably, about 16 to about 22, even more preferably about 16 to about 20. One preferred hydrocarbon isocyanate for use in the present invention has the Formula (V):

$C_{18}H_{37}\cdot N=C=O$ (V)

(octadecyl isocyanate) which has 18 carbons in the nitrogen-linked alkyl chain.

The urethane-linked group need not be a continuous aliphatic hydrocarbon chain, and may include other atoms or radicals capable of being present in the isocyanates, provided that they do not substantially interfere with the desired release property of the polymer formed therefrom and that they permit a urethane-linked side chain that terminates with an alkyl group of at least about 16 carbon atoms, preferably having about 16 carbon atoms to about 26 carbon atoms in length and having a terminal methyl group.

The hydrocarbon isocyanate is preferably a monofunctional isocyanate, so as to minimize crosslinking of the polymer. Too much crosslinking may impair hot-melt processing of the release material. In some applications, however, crosslinking may be desired. For example, to modify viscosity of the release material or impart solvent-resistance to the release material, minor amounts (i.e., less than about 0.5 weight %, based on total weight of the hydrocarbon isocyanate and backbone polymer) of di- or poly-functional isocyanates may be used in those instances.

Alternatively, the release material may be crosslinked subsequent to processing by, for example, radiation devices (e.g., electron beam and UV-radiation devices).

Reaction Process

The reaction may be carried out as a batch process using, for example, a BRABENDER-type mixer or similar melt mixing apparatus, provided the processing temperature is sufficient to permit interaction of the reactants. The reaction can also be carried out as a continuous process using, for example, a single-screw extruder or, preferably, a twin-screw extruder. Although any suitable reactor can be used, preferably, the reactor is a wiped surface, counter-rotating or co-rotating twin-screw extruder, such as those described in U.S. Pat. No. 5,314,959 (Rolando et al.). Most preferably, the reactor is a counter-rotating twin-screw extruder.

The temperature in the reactor should be sufficient to permit the reaction to occur. The temperature should also be sufficient to permit flow of the materials through the reactor, and any subsequent processing equipment (e.g., feedblocks and dies). To maintain flow of the reacted material, the temperature should preferably be in the range of about 140° C. to about 250° C., more preferably in the range of about 160° C. to about 230° C.

Residence time in the reactor typically varies from about 5 seconds to about 12 minutes. More typically, residence time is about 15 seconds to about 5 minutes. The residence time depends on several parameters, including, for example, the length to diameter ratio of the reactor, screw speed, overall flow rates, and screw designs.

The reactants are preferably fed into an extruder at unvarying rates. Such feeding rates generally reduce undesirable variability in final products. The reactants are added in amounts based on the desired polymer stoichiometry. Feed rates are dependent on extruder dimensions and other parameters that vary with the extruder equipment used and desired throughput.

For adequate levels of release, the overall weight % of the release component reacted is preferably at least about 20 weight %, based on total weight of the polymer. More preferably, the overall weight % of the release component reacted is at least about 25 weight %, even more preferably, at least about 30 weight %, most preferably, at least about 35 weight %, based on total weight of the reactants.

Optionally, a catalyst may be included as a reactant. Any suitable catalyst may be used. For example, suitable catalysts can be found in Table XXX of Saunders, J. H. and K. C. Frisch, *Polyurethanes Chemistry and Technology, Part I: Chemistry* (1962), pp. 167–69. A suitable catalyst that is solid at room temperature is triethylenediamine. Suitable catalysts that are liquid at room temperature include, for example, 1,8 diaza-bicyclo(5, 4, 0)undecene-7, stannous octoate, and dibutyl tin dilaurate. A liquid catalyst may be preferred depending on the processing equipment and throughput of the release material. When used, the catalyst is used in an effective amount to increase the reaction rate of the reactants. Typically, if used, the catalyst is added in amounts of less than about 1 weight % based on total weight of the reactants.

Furthermore, reactants of the present invention may include other optional additives. Preferred optional additives are selected from the group of a crosslinker; a defoamer; a leveling agent; a colorant; a fluorescing agent; an adhesion promoter; a plasticizer; a thixotropic agent; a rheology modifier; a film former; a biocide/anti-fungal agent; a corrosion inhibitor; an antioxidant; a stabilizer; a surfactant/emulsifier; an extender (e.g., thickener or filler); and mixtures thereof.

When using additives that are reactive with the reactants, such additives are typically added further downstream in the extruder, where substantial reaction of the reactants has already taken place. However, additives that are essentially non-reactive with the reactants can be added in any order, provided the addition of an additive does not substantially interfere with reaction of the reactants (i.e., reaction of the reactants is completely prevented). Furthermore, the reactants can be added simultaneously or, preferably, sequentially into the reactor and in any sequential order. Preferably, however, the backbone polymer is sequentially added prior to the release component. In certain situations, when appropriate, additives may also be added to the reactants prior to their incorporation into the reactor.

It should also be noted that, prior to adding the components to the reactor, especially the backbone polymer, they are preferably dried (i.e., solvents, such as water, are removed therefrom, preferably to amounts of about 0.10 weight % or less, more preferably about 0.06 weight % or less, most preferably about 0.02 weight % or less based on total weight of the component). Any suitable method can be used to dry the components. For example, the components can be dried by placing them on drying beds under a forced air drier, vacuum drying, or in-situ drying while in an extruder. Duration of the drying time and the temperature can be adjusted depending he initial solvent content in the component. One of ordinary skill in the art would readily appreciate that many combinations of drying time and temperatures are suitable for drying the components.

The components, particularly the release component (e.g., hydrocarbon isocyanate component), can also be purified to remove contaminants and other undesirably by-products by filtering and other purification techniques. Such purification can occur prior to adding the individual component to the reactor and/or as the component is being added to the reactor.

Release-Coated Substrates

The release material of the present invention can be generally used as a release coating for a solid substrate, which may be, for example, a sheet, a fiber, or a shaped object. One preferred type of substrate is that which is used for adhesive-coated articles (e.g., pressure-sensitive-adhesive-coated articles), such as tapes, labels, bandages, and the like. The composition may be applied to at least a portion of at least one major surface (typically the entire surface) of suitable flexible or inflexible substrate materials. Useful flexible substrate materials include paper, plastic films such as polypropylene, polyethylene, polyvinylchloride, polytetrafluoroethylene, polyester (e.g., polyethylene terephthalate), cellulose acetate, and the like.

Substrates can also be of woven fabric formed of threads of synthetic fibers or natural materials such as cotton or blends of these. Alternatively, substrate materials may be nonwoven fabric, such as air-laid webs of synthetic or natural fibers or blends of these. In addition, suitable substrates can be formed of metal, foils, or ceramic sheet material. Primers known in the art can be utilized to aid in the adhesion of the release coating to the substrate.

Preferably, the release materials are hot-melt coated on a substrate using an extruder. In this manner, the release material can be directly coated subsequent to its "in-situ" preparation from the same piece of processing equipment. However, the release materials may alternatively be coated out of, for example, a suitable organic solvent (e.g., organic solvents in which the release material is soluble), although the release properties may differ from those of release coatings that are formed via hot-melt processing. If coated out of solvent, the desired concentration of the release material in a release coating composition made therefrom depends upon the method of coating and upon the desired final coating thickness. Typically, the release coating composition is coated at about 1% to about 15% solids.

If coating out of solvent, a release coating composition may be applied to a suitable substrate by means of conventional coating techniques, such as wire-wound rod, direct gravure, offset gravure, reverse roll, air-knife, and trailing blade coating. The coating can be dried at room temperature, at an elevated temperature, or a combination thereof, provided that the backing material can withstand the elevated temperature. Typically, the elevated temperature is about 60° C. to about 130° C. The resulting release coating provides an effective release for a wide variety of conventional pressure-sensitive adhesives, such as natural rubber-based, acrylic, tackified block copolymer, poly(alpha)olefin, silicone, and other synthetic film-forming, elastomeric materials.

In a further embodiment, the release material may be blended with one or more polymers subsequent to its preparation. For example, the release material may be blended with ethylene/vinyl copolymers, modified ethylene/vinyl acetate copolymers, and/or polyolefins (e.g., polyethylene or polypropylene), such as when forming a release coating composition. Any suitable method can be used for preparing such blends. For example, blending of the release material with a second polymer may be done by any method that results in a substantially homogenous distribution of the polymers. For example, the polymers can be blended in-situ by sequential polymerization. Alternatively, the polymers can be blended by melt blending, solvent blending, or any suitable physical means.

The release material of the present invention can be used to form a release-coated substrate in a variety of articles, such as a low adhesion backsize (LAB) for pressure-sensitive adhesive (PSA) tapes (e.g., rolls of single-sided tape). Conventionally, single-sided tapes include a backing having an adhesive layer adhered to one side thereof and a release coating on the other side thereof. Tapes can be used in a wide variety of applications such as to adhere two surfaces together (e.g., flaps of packing material) or in the medical area (e.g., wound dressings). Other articles in which the release material may be utilized include release liners, labels, wound dressings, and medical grade tapes.

Backing

When preparing articles containing release-coated substrates, such as tapes, the backing may be selected from a wide variety of materials. For example, when the release material is co-extruded with the backing, the backing layer typically comprises a hot-melt processable polymer. Representative examples of these materials include polyamides (e.g., nylon); polyolefins (e.g., polypropylene, polyethylene, polybutylene, poly-4-methylpentene and others); polystyrene; polyester; copolyester; polyvinyl chloride; polyvinyl acetate; copolymers (e.g., ethylene/propylene copolymer, propylene/butylene copolymer, ethylene/butyl acrylate copolymer, and thermoplastic rubber block copolymers); polymethyl methacrylate; and mixtures and copolymers thereof. Especially preferred backing materials include polypropylene, polypropylene blended with small amounts (e.g., up to about 10% by weight based on total weight of the backing material) of other polyolefins, and copolymers of propylene and other alpha-olefins. A preferred backing is semi-crystalline polypropylene having a melting point greater than about 160° C.

Many of the aforementioned polymeric materials are commercially available and may be used without modification. Alternatively, they may be modified in ways well known to one of ordinary skill in the art. For example, the compositions for preparing polymeric backings can be modified with minor amounts of conventional modifiers (e.g., colorants; pigments; dyes; fluorescing agents; antioxidants; and fillers, such as zinc oxide, titanium dioxide, calcium carbonate, hydrocarbon resins, and the like).

When the release material is extrusion-coated onto a pre-existing backing, the backing may be selected from the list of thermoplastic materials identified above. Additionally, it may be selected from non-thermoplastic polymers, metals, cloth, non-woven webs (polymeric and non-polymeric), polymeric foam, ceramic, paper, and the like.

When the release material is co-extruded with the backing or is extrusion-coated onto a polymer backing, it is also preferred for some applications that the backing be orientable in at least one direction after extrusion of the release coating to form an oriented release-coated backing. As such, orientable backings selected from the aforementioned polymeric materials are especially preferred backing layers for forming release-coated substrates of the present invention. The term "oriented" herein refers to strengthening the polymer by stretching at a temperature below its crystalline melting point. For example, suitable polypropylene substrates or backings can be cast polypropylene films, mono-axially oriented polypropylene (MOPP), biaxially oriented polypropylene (BOPP), or simultaneously biaxially oriented polypropylene (SBOPP).

Tie Layer

Hot-melt processable tie layers can be used to improve interlayer adhesion between co-extruded release materials and backings, for example. Examples of useful tie layers include: modified ethylene/vinyl acetate copolymers (e.g., BYNEL CXA 1123, commercially available from DuPont Chemical Co.; Wilmington, Del.), maleated polypropylenes, ethylene/acrylic acid copolymers, and other materials.

Adhesive

When preparing adhesive-coated articles including the release material of the present invention, any suitable adhesive can be used. Adhesives useful in the preparation of articles containing the release material of the present invention include solvent-coated, water-based, hot-melt-processable, and radiation-activated adhesive systems. Pressure-sensitive-adhesives (PSAs) are a preferred class of adhesives for use in the invention. Those of ordinary skill in the art appreciate how to formulate a wide variety of PSAs.

Adhesives used in the present invention can be extrudable, such that they can be co-extruded with the release material and a backing material when forming tapes, for example. They may be crosslinked, if desired, after application. While it is preferred that the adhesive be applied by extrusion techniques, however, the adhesive may be applied by a variety of other techniques. It may be co-extruded with the release layer alone, or with a backing and release layer. Alternatively, it may be extruded onto a pre-existing surface.

Coating Conditions

The thickness of the release coating may be varied within a very wide range. For example, the coating thickness may vary from 0.1 (or less) micrometer ($\mu$m) to as thick as desired. Preferably, the release layer is less than about 1 $\mu$m thick. The thickness of the applied release coating can be significantly reduced by orienting the release coated film after the release material has been extruded onto the backing layer.

The release materials and processes herein are exemplified in the following examples. These examples are merely for illustrative purposes only and are not meant to be limiting on the scope of the appended claims. All parts, percentages, ratios, etc. in the examples and the rest of the specification are by weight unless indicated otherwise.

EXAMPLES

Examples 1–5

Examples 1–5 demonstrate the effect of varying the weight % based on total weight of the terpolymer reactants of long chain alkyl incorporation on the polymer properties. In Example 1, EVAL E105A (an ethylene/vinyl alcohol copolymer containing 44 mole % ethylene, commercially available from EVAL Company of America; Lisle, Ill.) was fed into the feed zone of a 34-millimeter diameter, counter-rotating twin-screw extruder having a 36:1 length-to-diameter ratio (Model LSM30.34, available from Leistritz Corporation; Allendale, N.J.) at a rate of 28.8 grams/minute. The extruder had double-start, fully intermeshing screws through the first four zones and single-start fully intermeshing screws through the remaining zones. The screw rotation rate was 100 revolutions per minute. DESMODUR O (octadecyl isocyanate (ODI), commercially available from Miles Laboratories, Inc.; Pittsburgh, Pa.) premixed with 1% by weight DABCO Crystalline catalyst, (triethylene diamine, commercially available from Air Products and Chemicals Inc.; Allentown, Pa.) was injected into the fifth zone at a rate of 10.8 grams/minute (27.2 weight % ODI). The temperature profiles for all of the 120-millimeter long zones were set at 205° C. The resultant vinyl octadecyl carbamate/vinyl alcohol/ethylene terpolymer was extruded into a 3-millimeter-diameter strand, quenched in an ice water bath, pelletized and collected.

A three-layer construction was prepared with the use of a CLOREON 3-layer co-extrusion feedblock (commercially available from Cloreon, Inc.; Orange, Tex.) heated to 232° C. to produce a 3-layered stream. The vinyl octadecyl carbamate/vinyl alcohol/ethylene terpolymer was extruded as a release layer at a rate of 15.1 grams/minute through a KILLION 2.54 centimeter (1.0 inch) diameter, 24:1 length-to-diameter ratio single-screw extruder (commercially available from Killion Extruders; Cedar Grove, N.J.). The middle or "tie" layer was BYNEL CXA 1123 (an ethylene/vinyl acetate copolymer, commercially available from DuPont Chemical Co.; Wilmington, Del.) processed at 2.7 kilograms/hour through a DAVIS-STANDARD 3.81centimeter (1.5 inch) diameter 24:1 length-to-diameter ratio single-screw extruder (commercially available from Davis-Standard; Pawcatuck, N.J.). The third or backing layer was SHELL 7CO5N (a polypropylene/ethylene copolymer, commercially available from Shell Chemical Co.; Houston, Tex.) extruded at a total rate of 68.1 kilograms/hour through a DAVIS-STANDARD 6.35 centimeter (2.5 inch) diameter 24:1 length-to-diameter ratio single-screw extruder (commercially available from Davis-Standard; Pawcatuck, N.J.). The three polymer streams were each fed into separate ports of the CLOREON feedblock. A 63.5 centimeter wide (25.0 inch) die was used to cast the co-extruded construction into a film. The film was cast onto a chrome chill roll and rubber nip roll, at a rate of 26 meters/minute, to afford a 89-micrometer-thick, 3-layer construction release film. The vinyl octadecyl carbamate/vinyl alcohol/ethylene terpolymer release layer was 1.1 micrometers thick.

Samples were prepared for release testing by attaching the non-release side of the film (the backing layer) to a 5.1 centimeter by 12.7 centimeter steel panel using double-coated adhesive tape (commercially available from Minnesota Mining & Manufacturing Co.; St. Paul, Minn. under the trade designation STA 305). A 2.54-centimeter wide strip of Tape A (a block copolymer-based, pressure-sensitive-adhesive tape, commercially available from Minnesota Mining & Manufacturing Co.; St. Paul, Minn. under the trade designation STA141) was adhered to the release layer using 2 passes of a 2 kilogram hard rubber roller.

The tapes were either peeled immediately (initial release) or allowed to dwell for 15 days at 50° C. (heat aged), prior to peeling to find the peel adhesion value for each tape. The peel force was measured using an INSTRON tensile tester (commercially available from Instron Corp.; Canton, Mass.) at a peel angle of 90 degrees and a peel rate of 0.30 meters/minute.

Readhesion values were measured by taking the tapes peeled from the release surface and rolling them onto a smooth polyethylene film (commercially available from Minnesota Mining & Manufacturing Co.; St. Paul, Minn. under the trade designation STA211). The readhesion samples were then peeled on the INSTRON tensile tester at a peel angle of 90 degrees and a peel rate of 0.30 meters/minute.

Peel adhesion of a previously non-bonded Tape A to the smooth polyethylene film was measured as the control adhesion. The readhesions are reported as the percentage of the control adhesion.

In Example 2, a vinyl octadecyl carbamate/vinyl alcohol/ethylene terpolymer was prepared and tested as in Example 1, except the feed rate of the EVAL E105A was 15.0 grams/minute and the feed rate of the DESMODUR O was 11.1 grams/minute (42.5% ODI by total weight of the terpolymer reactants).

In Example 3, a vinyl octadecyl carbamate/vinyl alcohol/ethylene terpolymer was prepared and tested as in Example 1, except the feed rate of the EVAL E105A was 15.0 grams/minute and the feed rate of the DESMODUR O was 22.3 grams/minute (59.7% ODI by total weight of the terpolymer reactants).

In Example 4, a vinyl octadecyl carbamate/vinyl alcohol/ethylene terpolymer was prepared and tested as in Example 1, except the feed rate of the EVAL E105A was 15.0 grams/minute and the feed rate of the DESMODUR O was 33.7 grams/minute (69.2% ODI by total weight of the terpolymer reactants).

In Example 5, vinyl octadecyl carbamate/vinyl alcohol/ethylene terpolymers were prepared and tested as in Example 1, except the feed rate of the EVAL E105A was 16.1 grams/minute and the feed rate of the DESMODUR O was 48.2 grams/minute (75.0% ODI by total weight of the terpolymer reactants). Example 5 was not co-extruded a 3-layer construction release film due to limited quantity of the material.

TABLE 1

| Example No. | Weight % ODI | Release Force (N/dm) | | Readhesion (% of Control) | |
| --- | --- | --- | --- | --- | --- |
| | | initial | heat aged (15 days at 50° C.) | initial | heat aged (15 days at 50° C.) |
| 1 | 27.2 | 33.2 | 39.6 | 109 | 93 |
| 2 | 42.5 | 6.70 | 12.4 | 87 | 145 |
| 3 | 59.7 | 5.43 | 5.24 | 61 | 52 |
| 4 | 69.2 | 5.24 | 5.16 | 60 | 49 |
| 5 | 75.0 | N/A | N/A | N/A | N/A |

Examples 6–9

Examples 6–9 demonstrate the effect of changing the ethylene content in the ethylene/vinyl alcohol copolymer, while maintaining the level of long chain alkyl incorporation at a relatively constant level. In Example 6, EVAL L101A (an ethylene/vinyl alcohol copolymer containing 27 mole % ethylene, commercially available from EVAL Company of America; Lisle, Ill.) was fed at a rate of 44.5 grams/minute into the feed zone of a 34-millimeter diameter counter-rotating twin-screw extruder having a 36:1 length-to-diameter ratio (commercially available from Leistritz Corporation; Allendale, N.J.). The extruder had double-start, fully intermeshing screws through the first two zones, single-start fully intermeshing screws through the next six zones, a kneading section and triple-start fully intermeshing screws through the next one and a half zones, and the remaining length consisted of single-start, fully intermeshing screws. The screw rotation rate was 200 revolutions per minute. DESMODUR O (octadecyl isocyanate (ODI), commercially available from Miles Laboratories, Inc.; Pittsburgh, Pa.) premixed with 1% by weight DABCO Crystalline catalyst (triethylene diamine, commercially available from Air Products and Chemicals Inc.; Allentown, Pa.) was injected into the third zone at a rate of 31.1 grams/minute (41.1% ODI by weight based on total weight of the terpolymer reactants). The temperature profile for each of the 120-millimeter long zones was set at 205° C. A vacuum was applied at zones 8–9 to afford devolatilization of volatile components. The resultant vinyl octadecyl carbamate/vinyl alcohol/ethylene terpolymer was extruded into a 3-millimeter-diameter strand, quenched in an ice water bath, pelletized and collected.

In Examples 7, 8, and 9, the vinyl octadecyl carbamate/vinyl alcohol/ethylene terpolymers were prepared and tested as in Example 6, except that ethylene/vinyl alcohol copolymers with different ethylene contents were used instead of EVAL L101A. EVAL F101A (an ethylene/vinyl alcohol copolymer having 32 mole % ethylene, commercially available from EVAL Company of America; Lisle, Ill.) was used for Example 7. EVAL H101A (an ethylene/vinyl alcohol copolymer having 38 mole % ethylene, commercially available from EVAL Company of America; Lisle, Ill.) was used for Example 8. EVAL G156B (an ethylene/vinyl alcohol copolymer having 48 mole % ethylene, commercially available from EVAL Company of America; Lisle, Ill.) was used for Example 9.

Feed rates for the ethylene/vinyl alcohol copolymers of Examples 7–9 were 44.2 grams/minute, 43.7 grams/minute, and 42.9 grams/minute, respectively. Feed rates for the ODI of Examples 7–9 were 31.5 grams/minute (41.6% ODI by weight based on total weight of the terpolymer reactants), 32.3 grams/minute (42.5% ODI by weight based on total weight of the terpolymer reactants), and 32.7 grams/minute (43.2% ODI by weight based on total weight of the terpolymer reactants), respectively.

Co-extrusion and testing of Examples 7–9 was performed as in Example 1, except Example 9 was not tested because the resulting co-extruded film had holes/voids therein.

TABLE 2

| Example No. | Mole % ethylene in copolymer | Release Force (N/dm) | | Readhesion (% of Control) | |
| --- | --- | --- | --- | --- | --- |
| | | initial | heat aged (15 days at 50° C.) | initial | heat aged (15 days at 50° C.) |
| 6 | 27 | 4.43 | 6.93 | 69 | 39 |
| 7 | 32 | 2.0 | 6.51 | 74 | 53 |

TABLE 2-continued

| Example No. | Mole % ethylene in copolymer | Release Force (N/dm) | | Readhesion (% of Control) | |
| --- | --- | --- | --- | --- | --- |
| | | initial | heat aged (15 days at 50° C.) | initial | heat aged (15 days at 50° C.) |
| 8 | 38 | 35.7 | 36.6 | 82 | 101 |
| 9 | 48 | N/A | N/A | N/A | N/A |

Example 10

In Example 10, EVAL E105A (an ethylene/vinyl alcohol copolymer containing 44 mole % ethylene, commercially available from EVAL Company of America; Lisle, Ill.) was fed into the feed zone of a 40-millimeter-diameter, co-rotating twin-screw extruder having a 40:1 length-to-diameter ratio (Model ZE40, commercially available from Berstorff Corporation; Charlotte, N.C.) at a rate of 86.6 grams/minute. DABCO Crystalline catalyst, (triethylene diamine, commercially available from Air Products and Chemicals Inc.; Allentown, Pa.) was also fed into the feed zone at a rate of 0.9 grams/minute. The screw rotation rate was 75 revolutions per minute. DESMODUR O (octadecyl isocyanate (ODI), commercially available from Miles Laboratories, Inc.; Pittsburgh, Pa.) was injected into the fourth zone at a rate of 64.7 grams/minute (42.8% ODI by weight based on total weight of the terpolymer reactants). The temperature profiles for the 160-millimeter long zones were set at 210° C. for the first heat zone, 225° C. for the next five zones and 200° C. for the last four zones. The resultant vinyl octadecyl carbamate/vinyl alcohol/ethylene terpolymer was extruded into a 3-millimeter diameter strand, quenched in an ice water bath, pelletized and collected.

A four-layer construction was prepared with the use of a CLOREON 5-layer co-extrusion feedblock (commercially available from Cloreon Inc.; Orange, Tex.) heated to 232° C. to produce a 4-layered stream. The first layer or "release" layer of vinyl octadecyl carbamate/vinyl alcohol/ethylene terpolymer was extruded at a rate of 10.6 grams/minute through a KILLION 1.9 centimeter (0.75 inch) diameter 24:1 length-to-diameter ratio, single-screw extruder (commercially available from Killion Extruders; Cedar Grove, N.J.). The second or "tie" layer was BYNEL CXA 1123 (an ethylene vinyl acetate, commercially available from DuPont Chemical Co.; Wilmington, Del.) processed at 37.8 grams/minute through a LEISTRITZ 34-millimeter-diameter 42:1 length-to-diameter ratio, co-rotating twin-screw extruder (commercially available from Leistritz Corporation; Allendale, N.J.). The third and fourth or "backing" layers were SHELL 7C50 (a polypropylene/ethylene copolymer, commercially available from Shell Chemical Co.; Houston, Tex.) extruded at a total rate of 708 grams/minute by two extruders in parallel to achieve the requisite thickness. The two extruders were: a BERLYN 5.08-centimeter (2.00 inch) diameter 30:1 length-to-diameter ratio single-screw extruder (commercially available from Berlyn Corp.; Worcester, Mass.) and a KILLION 3.18-centimeter (1.25 inch) diameter 24:1 length-to-diameter single-screw extruder (commercially available from Killion Extruders; Cedar Grove, N.J.). The four polymer streams were each fed into separate ports of the CLOREON feedblock to produce a 4-layered stream. A 45.7 centimeter (18.0 inch) wide die was used to cast the co-extruded construction into a film. Both the feedblock and die were operated at 216° C. The film was cast onto a chrome chill roll at 25.4 meters/minute to form a 76.2 micrometers thick release film with the vinyl octadecyl carbamate/vinyl alcohol/ethylene terpolymer release layer having a thickness of 1.1 micrometers.

Samples for release testing were prepared by rolling down strips of test tapes (as identified in Table 3) onto the vinyl octadecyl carbamate/vinyl alcohol/ethylene terpolymer release layer of the release film using 6 passes of a 2-kilogram hard rubber roller. The tapes were either peeled immediately (initial release) or allowed to dwell for 7 days at 21° C. or at 50° C., prior to peeling. The peel force was measured using an IMASS slip/peel tester (Model 3M90, commercially available from Instrumentors Inc., Strongsville, Ohio) at a peel angle of 180 degrees and a peel rate of 2.3 meters/minute (90 inches/minute) (except in the case of Tape A, which was peeled at 0.30 meters/minute (12 inches/minute) to avoid excessive stretching of the backing).

Readhesions were measured by taking the tapes peeled from the vinyl octadecyl carbamate/vinyl alcohol/ethylene terpolymer release layer and rolling them down onto a organic solvent-cleaned (i.e., the glass was cleaned initially with diacetone alcohol and then sequentially with 2-propanol, n-heptane and methyl ethyl ketone; between each test, the glass was cleaned sequentially with 2-propanol, n-heptane and methyl ethyl ketone) glass surface placed in the peel tester. The tapes were peeled at 180 degrees and 2.3 meters/minute (90 inches/minute) (except for Tape A, which was peeled at 0.30 meters/minute (12 inches/minute)).

Peel adhesion of previously non-bonded tapes to the cleaned glass surface were measured as the control adhesion for each type of tape. The readhesions are reported as the percentage of the control adhesion.

TABLE 3

| Test Tape | Release Force (N/dm) | | Readhesion (% of Control) | |
| --- | --- | --- | --- | --- |
| | 7 days, 21° C. | 7 days, 50° C. | 7 days, 21° C. | 7 days, 50° C. |
| A | 2.6 | 2.1 | 96 | 94 |
| B | 9.2 | 8.0 | 92 | 85 |
| C | 11 | 24 | 99 | 77 |
| D | 1.9 | 1.4 | 101 | 82 |

Tape A: A block copolymer based pressure-sensitive-adhesive tape, commercially available as tape STA141 from Minnesota Mining & Manufacturing Co., St. Paul, MN.
Tape B: An acrylate copolymer pressure-sensitive-adhesive tape, commercially available as tape no. 810 from Minnesota Mining & Manufacturing Co., St. Paul, MN.
Tape C: An acrylate copolymer pressure-sensitive-adhesive tape, commercially available as tape no. 845 from Minnesota Mining & Manufacturing Co., St. Paul, MN.
Tape D: A tackified styrene-isoprene-styrene (SIS) block copolymer pressure-sensitive-adhesive tape, commercially available as high performance box sealing tape no. 375 from Minnesota Mining & Manufacturing Co., St. Paul, MN.

Example 11

First, 1.0 gram of the material prepared in Example 10 was dissolved in 19 grams of 1-methyl-2-pyrrolidinone (NMP) at 95° C. The solution was uniformly coated with a #6 MAYER bar onto a polypropylene film that was continually heated to 90° C. to give an approximate coating thickness of 0.3 micrometers. The coating was allowed to dry at 90° C. for 1.5 minutes and then cooled to room temperature. The clear, coated film was then ready for testing. Peel and readhesion results were obtained for two test tapes (as described in Table 6) according to the method described in Example 10 after being allowed to dwell for 7 days at 21° C. The results are presented in Comparative Table 1.

TABLE 4

| Test tape | Release force (N/dm) | Readhesion (% of control) |
| --- | --- | --- |
| B | 31 | 31 |
| D | 2.7 | 77 |

Tape B: An acrylate copolymer pressure-sensitive-adhesive tape, commercially available as tape no. 810 from Minnesota Mining & Manufacturing Co., St. Paul, MN.
Tape D: A tackified styrene-isoprene-styrene (SIS) block copolymer pressure-sensitive-adhesive tape, commercially available as high performance box sealing tape no. 375 from Minnesota Mining & Manufacturing Co., St. Paul, MN.

The peel/readhesion results show that these release films have higher peel and lower readhesion values than those of the comparable co-extruded release films of Example 10.

Various modifications and alterations of this invention will become apparent to those skilled in the art without departing from the scope and spirit of the invention. It should be understood that this invention is not limited to the illustrative embodiments set forth herein.

What is claimed is:

1. A hot-melt processable release material preparable according to an essentially solventless process comprising the steps of:
   providing reactants, wherein the reactants comprise:
      at least one backbone polymer having a grafting site that is reactive with a release component to selectively form a release moiety substituent at the grafting site; and
      greater than 20 weight %, based on total weight of the reactants, of a release component that is reactive with the grafting site, wherein the grafting site comprises a hydroxyl group;
   mixing the reactants in the reactor;
   allowing the reactants to react as described to form the release material; and
   removing the release material from the reactor.

2. A hot-melt processable release material prepared according to an essentially solventless process comprising the steps of:
   providing reactants, wherein the reactants comprise:
      at least one backbone polymer having a grafting site that is reactive with a release component to selectively form a release moiety substituent at the grafting site; and
      greater than 20 weight %, based on total weight of the reactants, of a release component that is reactive with the grafting site, wherein the grafting site comprises a hydroxyl group;
   mixing the reactants in the reactor;
   allowing the reactants to react as described to form the release material; and
   removing the release material from the reactor.

3. A hot-melt processable release material comprising a polymer prepared according to an essentially solventless process comprising the steps of:
   providing reactants, wherein at least one of the reactants comprises at least one hydroxyl group, to a reactor, wherein the reactants comprise:
      at least one backbone polymer having a grafting site that is reactive with a release component to selectively form a release moiety substituent at the grafting site; and greater than 20 weight %, based on total weight of the reactants, of a release component that is reactive with the grafting site, wherein the polymer comprises polymeric units represented by those in formula:

$$-(CH_2-CH)_x-(CH_2-CH)_y-(CH_2-CH)_z-$$
$$\quad\quad\quad | \quad\quad\quad\quad | \quad\quad\quad\quad |$$
$$\quad\quad\quad R^1 \quad\quad\quad R^2 \quad\quad\quad R^3$$

wherein:
$R^1$ is independently selected from the group consisting of H and an aliphatic group;
$R^2$ is independently selected from the group consisting of a functional group and an organic group having a terminal functional group;
$R^3$ is independently an organic group having a urethane linkage to the backbone polymer and a terminal alkyl group; and
x, y, and z represent mole fractions of the individual polymeric units;
    mixing the reactants in the reactor;
    allowing the reactants to react as described to form the release material; and
    removing the release material from the reactor.

4. The hot-melt processable release material of claim 3, wherein $R^1$ is independently selected from the group consisting of H and an alkyl group.

5. The hot-melt-processable release material of claim 3, wherein the terminal alkyl group of $R^3$ comprises at least about 16 carbon atoms.

6. The hot-melt-processable release material of claim 5, wherein the terminal alkyl group of $R^3$ comprises about 16 carbon atoms to about 20 carbon atoms.

7. The hot-melt-processable release material of claim 3, wherein the release material consists essentially of the polymer.

8. A substrate at least partially coated with the hot-melt processable release material of claim 2.

9. An article comprising:
    a backing having a first side and second side; and
    the hot-melt processable release material of claim 2 coated on at least a portion of the first side of the backing and, optionally, on at least a portion of the second side of the backing.

10. The article of claim 9, wherein the article is a tape, further comprising an adhesive coated on at least a portion of the backing.

11. The hot-melt processable release material of claim 3, wherein $0 \leq x \leq 0.80$.

12. The hot-melt processable release material of claim 3, wherein $0.40 \leq x \leq 0.60$.

13. The hot-melt processable release material of claim 3, wherein $0 \leq y \leq 0.97$.

14. The hot-melt processable release material of claim 3, wherein $0 \leq y \leq 0.57$.

15. The hot-melt processable release material of claim 3, wherein $0.03 \leq z \leq 1.00$.

16. The hot-melt processable release material of claim 3, wherein $0.03 \leq z \leq 0.60$.

17. The hot-melt processable release material of claim 3, wherein the polymer comprises polymeric units represented by those in formula:

$$-(CH_2-CH_2)_x-(CH_2-CH)_y-(CH_2-CH)_z-$$
$$\quad\quad\quad\quad\quad\quad | \quad\quad\quad\quad |$$
$$\quad\quad\quad\quad\quad\quad OH \quad\quad\quad O$$
$$\quad\quad\quad\quad\quad\quad\quad\quad\quad\quad\quad |$$
$$\quad\quad\quad\quad\quad\quad\quad\quad\quad\quad\quad C=O$$
$$\quad\quad\quad\quad\quad\quad\quad\quad\quad\quad H-N$$
$$\quad\quad\quad\quad\quad\quad\quad\quad\quad\quad\quad\quad |$$
$$\quad\quad\quad\quad\quad\quad\quad\quad\quad\quad\quad\quad R^4$$

wherein $R^4$ is an alkyl group.

18. The hot-melt processable release material of claim 2, wherein the release component is reactive with the grafting site to form a urethane linkage.

19. The hot-melt processable release material of claim 3, wherein the grafting site comprises a hydroxyl group.

* * * * *

UNITED STATES PATENT AND TRADEMARK OFFICE
CERTIFICATE OF CORRECTION

PATENT NO. : 6,146,756
DATED : November 14, 2000
INVENTOR(S) : Ronald W. Ausen, Kevin T. Grove, Charles M. Leir, Audrey A. Sherman, and Walter R. Romanko It is certified that error appears in the above-identified patent and that said Letters Patent is hereby corrected as shown below:

Title page,
Column 2,
Line 14, "Part 1: Chemistry" should read -- *Part 1: Chemistry* --;

Column 2,
Line 15, "Pate" should read -- Patent --;
Line 58, after "reactor." insert a new paragraph;

Column 6,
Line 44, "th" should read -- the --;

Column 7,
Line 62, "exam e" should read -- example --;

Column 10,
Line 26, "he" should read -- on the --; and

Column 14,
Line 47, after "co-extruded" insert -- into --.

Signed and Sealed this

Sixth Day of November, 2001

Attest:

*Nicholas P. Godici*

NICHOLAS P. GODICI
*Attesting Officer*  *Acting Director of the United States Patent and Trademark Office*